(12) United States Patent
Sliger

(10) Patent No.: US 10,547,059 B2
(45) Date of Patent: Jan. 28, 2020

(54) SULFATE AND SULFONATE BASED SURFACTANTS FOR ALKALINE BATTERY ANODE

(71) Applicant: DURACELL U.S. OPERATIONS, INC., Wilmington, DE (US)

(72) Inventor: Michael Sliger, New Mildford, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

(21) Appl. No.: 15/901,730

(22) Filed: Feb. 21, 2018

(65) Prior Publication Data

US 2019/0260036 A1  Aug. 22, 2019

(51) Int. Cl.
*H01B 1/00* (2006.01)
*H01M 4/00* (2006.01)
(Continued)

(52) U.S. Cl.
CPC .............. *H01M 6/06* (2013.01); *H01B 1/02* (2013.01); *H01M 4/06* (2013.01); *H01M 4/08* (2013.01);
(Continued)

(58) Field of Classification Search
CPC ............ H01M 6/06; H01M 4/06; H01M 4/08; H01M 2004/027; H01M 2300/0014; H01B 1/02
(Continued)

(56) References Cited

U.S. PATENT DOCUMENTS 2,956,860 A  10/1960 Welsch et al.
4,021,911 A  5/1977 Kononenko et al.
(Continued)

FOREIGN PATENT DOCUMENTS

CN  105161660 A  12/2015
CN  106025284 A  10/2016
(Continued)

OTHER PUBLICATIONS

International Application No. PCT/US2018/062814, International Search Report and Written Opinion, dated Feb. 5, 2019.
(Continued)

*Primary Examiner* — Mark Kopec
(74) *Attorney, Agent, or Firm* — Marshall, Gerstein & Borun LLP

(57) ABSTRACT

An anode composition, an alkali battery, a method of making a battery anode, and a method of making a battery, wherein the anode comprises a zinc or zinc alloy and a surfactant of formula (I):

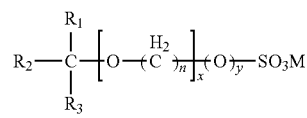

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl or aryl, at least one of $R_1$, $R_2$, and $R_3$ comprises a $C_2$-$C_{12}$ alkyl or aryl; or
(Continued)

when R₁ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

22 Claims, 1 Drawing Sheet

(51) Int. Cl.
    *H01M 6/06*    (2006.01)
    *H01M 4/08*    (2006.01)
    *H01M 4/06*    (2006.01)
    *H01B 1/02*    (2006.01)
    *H01M 4/02*    (2006.01)

(52) U.S. Cl.
    CPC ............ *H01M 2004/027* (2013.01); *H01M 2300/0014* (2013.01)

(58) Field of Classification Search
    USPC ...................................................... 252/500
    See application file for complete search history.

(56) References Cited

U.S. PATENT DOCUMENTS

| | | |
|---|---|---|
| 4,592,875 A | 6/1986 | Kesling, Jr. et al. |
| 5,128,222 A | 7/1992 | Yoshizawa et al. |
| 5,308,374 A | 5/1994 | Yoshizawa et al. |
| 5,342,712 A | 8/1994 | Mieczkowska et al. |
| 5,358,801 A | 10/1994 | Brodd |
| 5,698,315 A | 12/1997 | Hayashi et al. |
| 5,721,068 A | 2/1998 | West et al. |
| 5,770,256 A | 6/1998 | Ekern et al. |
| 5,919,598 A | 7/1999 | Flaim et al. |
| 5,997,775 A | 12/1999 | Hayashi et al. |
| 6,087,030 A | 7/2000 | Collien et al. |
| 6,586,139 B1 | 7/2003 | Watanabe et al. |
| 6,783,893 B2 | 8/2004 | Bowden et al. |
| 7,169,508 B2 | 1/2007 | Daniel-Ivad et al. |
| 7,226,696 B2 | 6/2007 | Ndzebet et al. |
| 7,278,904 B2 | 10/2007 | Woo et al. |
| 7,351,499 B2 | 4/2008 | Iltchev et al. |
| 7,435,395 B2 | 10/2008 | Durkot et al. |
| 7,465,384 B2 | 12/2008 | Levey et al. |
| 8,691,439 B2 | 4/2014 | Ndzebet et al. |
| 8,916,292 B2 | 12/2014 | Song et al. |
| 9,200,177 B2 | 12/2015 | Young et al. |
| 2003/0162092 A1 | 8/2003 | Armacanqui et al. |
| 2004/0033418 A1 | 2/2004 | Armacanqui et al. |
| 2007/0031722 A1 | 2/2007 | Adzic et al. |
| 2007/0154774 A1 | 7/2007 | Bluvstein |
| 2007/0248879 A1 | 10/2007 | Durkot et al. |
| 2007/0266554 A1 | 11/2007 | Bruce |
| 2007/0269719 A1 | 11/2007 | Sadamitsu et al. |
| 2009/0075175 A1 | 3/2009 | Inoue et al. |
| 2011/0217623 A1 | 9/2011 | Jiang et al. |
| 2012/0021303 A1 | 1/2012 | Amendola et al. |
| 2012/0064408 A1 | 3/2012 | Song et al. |
| 2012/0208086 A1 | 8/2012 | Plieth et al. |
| 2014/0072886 A1 | 3/2014 | Urban et al. |
| 2015/0010833 A1 | 1/2015 | Amendola et al. |
| 2016/0043442 A1 | 2/2016 | Zeine |
| 2016/0056508 A1 | 2/2016 | Flitsch et al. |
| 2016/0218352 A1 | 7/2016 | Musameh et al. |

FOREIGN PATENT DOCUMENTS

| | | |
|---|---|---|
| DE | 2620982 A1 | 11/1977 |
| JP | 49041607 B | 11/1974 |
| JP | S63248063 A | 10/1988 |
| JP | S63250061 A | 10/1988 |
| JP | H05211060 A | 8/1993 |
| JP | H07282803 A | 10/1995 |
| JP | 2000-040516 A | 2/2000 |
| JP | 2007-273407 A | 10/2007 |
| JP | 2007273407 A * | 10/2007 |
| WO | WO-99/66572 A1 | 12/1999 |
| WO | WO-2005/022675 A2 | 3/2005 |
| WO | WO-2008/039419 A2 | 4/2008 |
| WO | WO-2008/142818 A1 | 11/2008 |
| WO | WO-2014/033204 A1 | 3/2014 |
| WO | WO-2016/115016 A1 | 7/2016 |

OTHER PUBLICATIONS

"Specialty Surfactant Products", Brochure, Elementis Specialties (2013).

"Triton™ H-66 Surfactant" Product Information, Technical Data Sheet, The Dow Chemical Company (publicly available before Feb. 21, 2018).

"Triton™ QS-15 Surfactant", Product Information, The Dow Chemical Company (2009).

"Triton™ Sulfate-Based Surfactants" Product Safety Assessment, The Dow Chemical Company (Dec. 16, 2012).

"Triton™ W-30 Concentrate Surfactant", Product Information, Technical Data Sheet, The Dow Chemical Company (publicly available before Feb. 21, 2018).

"Triton™ X-100 Surfactant", The Dow Chemical Company (publicly available before Feb. 21, 2018).

"Triton™ XN-45S Surfactant", Product Information, Technical Data Sheet, The Dow Chemical Company, (publicly available before Feb. 21, 2018).

"Triton™ XQS-20 Surfactant", Product Information, Technical Data Sheet, The Dow Chemical Company (publicly available before Feb. 21, 2018).

"What is the chemistry of the TRITON X Series surfactants?", Dow Answer Center, The Dow Chemical Company (updated Jul. 25, 2017).

Ghaemi et al., Improved performance of rechargeable alkaline batteries via surfactant-mediated electrosynthesis of MnO2, J. Power Sources, 14192):340-50 (Mar. 2005).

Ghavami et al., Performance improvements of alkaline batteries by studying the effects of different kinds of surfactant and different derivatives of benzene on the electrochemical properties of electrolytic zinc, J. Power Sources, 162(2):893-9 (Nov. 2006).

Yampol'skaya et al., Effect of surface-active agents on the structure and composition of pastes for the negative electrode of a lead acid battery, Elektrokhimiya, 7(4):581-3 (1971).

* cited by examiner

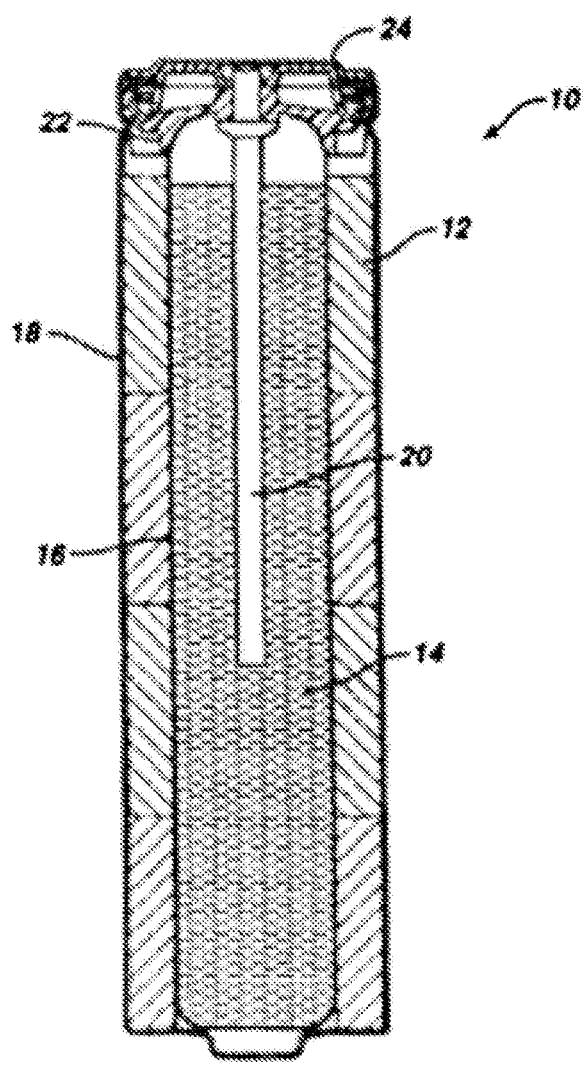

SULFATE AND SULFONATE BASED SURFACTANTS FOR ALKALINE BATTERY ANODE

FIELD OF THE DISCLOSURE

The disclosure relates to sulfate and sulfonate based surfactants for an alkaline battery anode and anodes and batteries comprising same.

BACKGROUND OF THE DISCLOSURE

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode, and an ionically conductive electrolyte solution is in intimate contact with the cathode, the anode, and the separator. The battery components are disposed in a can, or housing, that is typically made from metal.

When a battery is used as an electrical energy source in an electronic device, electrical contact is made to the anode and the cathode, allowing electrons to flow through the device and permitting the respective oxidation and reduction reactions to occur to provide electrical power to the electronic device. The electrolyte contains ions that flow through the separator between the anode and cathode to maintain charge balance throughout the battery during discharge.

There is a growing need to make batteries that are better suited to power contemporary electronic devices such as toys; remote controls; audio devices; flashlights; digital cameras and peripheral photography equipment; electronic games; toothbrushes; radios; and clocks. To meet this need, batteries may include higher loading of electrochemically active anode and/or cathode materials to provide increased capacity and service life. Batteries, however, also come in common sizes, such as the AA, AAA, AAAA, C, and D battery sizes, that have fixed external dimensions and constrained internal volumes. The ability to increase electrochemically active material loading alone to achieve better performing batteries is thus limited.

The composition of the anode is a design feature that may be adjusted in order to provide increased performance. For example, a surfactant can be included in the anode composition to create a protective layer around the zinc particles to inhibit a zinc corrosion reaction and the formation of hydrogen gas that can occur when the cell comprising the anode is at rest. The surfactant can adhere to the surfaces of the zinc anode particles, inhibiting hydroxide ions or water from approaching the zinc particles, thereby suppressing the corrosion of the zinc and the formation of hydrogen gas (reactions (I) and (II)) from taking place on the surfaces of the zinc particles.

$$Zn + 4OH^- \rightarrow Zn(OH)_4^{2-} + 2e^- \quad (I)$$

$$2H_2O + 2e^- \rightarrow 2OH^- + H_2 \quad (II).$$

Phosphate ester based surfactants are commonly used in the industry; however, this class of materials is commonly regarded as harmful to aquatic life forms and can be listed as a carcinogenic, mutagenic, or reprotoxic (CMR) material. Additionally, a commonly used phosphate ester material includes a nonylphenol functional group, which has regulated use in some countries due to health and environmental concerns.

SUMMARY OF THE DISCLOSURE

One aspect of the disclosure provides an anode composition comprising a zinc or zinc alloy and a surfactant of formula (I):

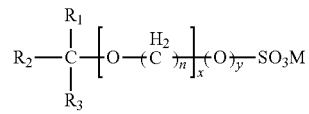

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl, at least one of $R_1$, $R_2$, and $R_3$ comprises a $C_2$-$C_{12}$ alkyl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

Another aspect of the disclosure provides an alkali battery comprising an anode composition comprising a surfactant of formula (I):

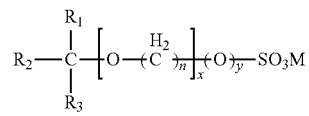

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl, at least one of $R_1$, $R_2$, and $R_3$ comprises a $C_2$-$C_{12}$ alkyl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

Another aspect of the disclosure provides a method of making a battery anode comprising, admixing a zinc or zinc alloy with a surfactant of formula (I):

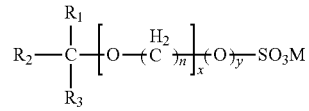

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl, at least one of $R_1$, $R_2$, and $R_3$ comprises a $C_2$-$C_{12}$ alkyl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

Yet another aspect of the disclosure provides a method of making a battery, comprising incorporating into a battery an anode including a zinc or zinc alloy and a surfactant of formula (I):

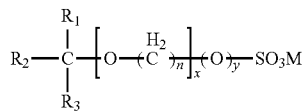

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl, at least one of $R_1$, $R_2$, and $R_3$ comprises a $C_2$-$C_{12}$ alkyl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the disclosure to the specific embodiments described herein.

BRIEF DESCRIPTION OF THE DRAWINGS

For further facilitating the understanding of the present disclosure, one drawing FIGURE is appended hereto.

The FIGURE is a side-sectional view of one embodiment of a battery.

DETAILED DESCRIPTION

The disclosure provides an anode composition, an alkali battery, a method of making a battery anode, and a method of making a battery, wherein the anode comprises a zinc or zinc alloy and a surfactant of formula (I):

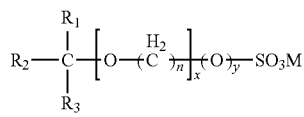

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl, at least one of $R_1$, $R_2$, and $R_3$ comprises a $C_2$-$C_{12}$ alkyl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

Anodes of the disclosure and batteries comprising anodes of the disclosure advantageously provide one or more benefits, for example, providing a zinc anode having a protective surfactant layer around the zinc particles to inhibit the zinc corrosion reaction and generation of hydrogen gas and/or providing a battery having good discharge capacity, without use of phosphate ester materials which are known to be harmful to aquatic life forms, carcinogenic, mutagenic, or reprotoxic and may have regulated use in some countries due to health and environmental concerns.

Referring to FIG. 1, a battery 10 includes a cathode 12, an anode 14, a separator 16, and a cylindrical housing 18. Battery 10 also includes a current collector 20, a seal 22, and a negative metal top cap 24, which serves as the negative terminal for the battery. Cathode 12 is in contact with housing 18, and the positive terminal of battery 10 is at the opposite end of the battery from the negative terminal. An alkaline electrolyte is dispersed throughout battery 10. Battery 10 can be, for example, an AA, AAA, AAAA, C, or D battery. While battery 10 can be cylindrical, in some embodiments, battery 10 can be non-cylindrical. For example, battery 10 can be a coin cell, a button cell, a wafer cell, or a racetrack-shaped cell. In some embodiments, a battery can be prismatic. In some embodiments, a battery can have a rigid laminar cell configuration or be provided in a flexible pouch, envelope or bag cell configuration. In some embodiments, a battery can have a spirally wound configuration, or a flat plate configuration. Suitable batteries are described, for example, in U.S. Pat. Nos. 6,783,893; 7,435,395, and U.S. Patent Application Publication No. 2007/0248879.

Anode

Anode 14 can be, for example, a zinc gel that includes zinc metal particles, a gelling agent or gelling agents, a surfactant, and optionally minor amounts of additives. In addition, a portion of the electrolyte solution is dispersed throughout the anode. The zinc particles may be alloys of zinc and, for example, aluminum, bismuth, calcium, gallium, indium, lithium, magnesium, lead, tin, or combinations thereof. Zinc particles can have a size in a range of 45 to 350 μm and a median particle diameter in a range of 80 to 255 μm as determined by COD imaging measurements. Zinc fines having a size of 44 microns or less can be included to increase the surface area of the zinc in the anode. Zinc fines can be included in amounts of about 1 wt. % to about 30 wt. %, about 5 wt. % to about 30 wt. %, about 10 wt. % to about 25 wt. %, for example, about 5 wt. %, about 10 wt. %, about 15 wt. %, about 20 wt. %, about 25 wt. %, or about 30 wt. %, based on the total weight of the zinc.

The amount of electrochemically active anode material within the anode may be referred to as the anode loading. The loading of the anode may vary depending upon the electrochemically active anode material used within, and the cell size of, the battery. For example, AA batteries with a zinc electrochemically active anode material may have an anode loading of at least about 3.3 grams of zinc, for example, at least about 4.0, about 4.3, about 4.6 grams, about 5.0 grams, or about 5.5 grams of zinc. AAA batteries, for example, with a zinc electrochemically active anode material may have an anode loading of at least about 1.9 grams of zinc, for example, at least about 2.0 or about 2.1 grams of zinc. AAAA batteries, for example, with a zinc electrochemically active anode material may have an anode loading of at least about 0.6 grams of zinc, for example, at least about 0.7 to about 1.0 grams of zinc. C batteries, for example, with a zinc electrochemically active anode material may have an anode loading of at least about 9.5 grams of zinc, for example, at least about 10.0 to about 15.0 grams of zinc. D batteries, for example, with a zinc electrochemically active anode material may have an anode loading of at least about 19.5 grams of zinc, for example, at least about 20.0 to about 30.0 grams of zinc.

Gelling Agent

Examples of gelling agents include polyacrylic acids, polyacrylonitrile, starch, starch derivatives, grafted starch materials (e.g., starch grafted polyacrylic acid, starch grafted polyacrylonitrile), salts of polyacrylic acids, polyacrylates, cellulosic derivatives, carboxymethylcellulose, sodium carboxymethylcellulose, or combinations thereof. Examples of such polyacrylic acids are Carbopol 940 and 934 (available from Lubrizol) and Polygel 4P (available from 3V Sigma), and an example of a grafted starch material is Waterlock A221 (Grain Processing Corporation, Muscatine, Iowa). Exemplary salts of a polyacrylic acid are Sanfresh AS-100 (available from Sanyo Chemical Industries), Sanfresh AS-150 (available from Sanyo Chemical Industries), and Alcosorb G1 (Ciba Specialties). The anode may include, for example, from about 0.1% by weight to about 2% by weight gelling agent.

Surfactant

The surfactant of the disclosure can comprise a surfactant according to formula (I):

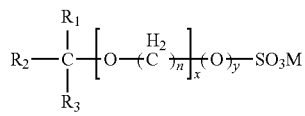

wherein $R_1$, $R_2$, and $R_3$ are each individually selected from hydrogen, $C_1$-$C_{12}$ alkyl, and aryl; y is null or 1, x is an integer from 2 to 30, n is an integer from 2 to 6, and M is hydrogen or an alkali metal; provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl, at least one of $R_1$, $R_2$, and $R_3$ comprises a $C_2$-$C_{12}$ alkyl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

In embodiments, $R_1$, $R_2$, and $R_3$ are each individually selected from hydrogen, $C_1$-$C_{12}$ alkyl, and aryl, provided that when two of $R_1$, $R_2$, and $R_3$ are hydrogen at least one of $R_1$, $R_2$, and $R_3$ is a $C_4$-$C_{12}$ alkyl or aryl; provided that when each of $R_1$, $R_2$, and $R_3$ are alkyl, at least one of $R_1$, $R_2$, and $R_3$ comprises a $C_2$-$C_{12}$ alkyl; and provided that when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl. As used herein, "alkyl" refers to either straight chained or branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_1$-$C_7$ alkyl refers to an alkyl group having a number of carbon atoms encompassing the entire range (i.e., 1 to 7 carbon atoms), as well as all subgroups and species falling there within (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl.

$R_1$, $R_2$, and $R_3$ can be individually selected from hydrogen, $C_1$-$C_{12}$ alkyl, a $C_2$-$C_{12}$ alkyl, a $C_3$-$C_{12}$ alkyl, a $C_1$-$C_{10}$ alkyl, a $C_2$-$C_8$ alkyl, a $C_3$-$C_5$ alkyl, a $C_4$-$C_8$ alkyl, a $C_6$-$C_{12}$ alkyl, or a $C_9$-$C_{12}$ alkyl for example, $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, or $C_{12}$ alkyl. In some embodiments, at least one of $R_1$, $R_2$, and $R_3$ comprises a $C_5$-$C_{12}$ alkyl. In some embodiments, at least two of $R_1$, $R_2$, and $R_3$ comprise a $C_2$-$C_{12}$ alkyl. In some embodiments, at least one of $R_1$, $R_2$, and $R_3$ comprises a $C_3$-$C_{12}$ alkyl. In some embodiments, at least one of $R_1$, $R_2$, and $R_3$ comprises at least $C_2$ alkyl, at least $C_3$ alkyl, at least $C_4$ alkyl, at least $C_5$ alkyl, or at least $C_6$ alkyl, for example, a $C_2$-$C_{12}$ alkyl. In some embodiments, at least one of $R_1$, $R_2$, and $R_3$ comprises a $C_2$-$C_{12}$ alkyl. In some embodiments, at least one of $R_1$, $R_2$, and $R_3$ comprises a $C_4$-$C_{12}$ alkyl. In some embodiments, at least one of $R_1$, $R_2$, and $R_3$ comprises a $C_5$-$C_{12}$ alkyl. In some embodiments, at least one of $R_1$, $R_2$, and $R_3$ comprises aryl. In some embodiments, at least one of $R_1$, $R_2$, and $R_3$ comprises a $C_5$ alkyl, at least one of $R_1$, $R_2$, and $R_3$ comprises a $C_4$ alkyl, and at least one of $R_1$, $R_2$, and $R_3$ comprises a $C_3$ alkyl. In embodiments, at least one of $R_1$, $R_2$, and $R_3$ comprises a $C_9$-$C_{12}$ alkyl and at least two of $R_1$, $R_2$, and $R_3$ comprise methyl ($C_1$ alkyl) or ethyl ($C_2$ alkyl).

Without intending to be bound by theory, it is believed that $R_1$, $R_2$, and $R_3$ can be selected to modify the packing density of the surfactant at the zinc particle surface. For example, packing density of the surfactant can be increased if one of $R_1$, $R_2$, and $R_3$ comprises an aryl group while the other two of $R_1$, $R_2$, and $R_3$ comprise hydrogen, because of low steric hindrance from the hydrogen groups and to a lesser extent the opportunity for pi-pi stacking of the aryl groups between surfactant molecules. As another example, the packing density of the surfactant can be decreased when each of $R_1$, $R_2$, and $R_3$ comprise an alkyl group because of the steric interaction between the alkyl branches. Without intending to be bound by theory, it is believed that as the packing density of surfactant molecules around the surface of zinc increases, the number of water molecules that can come close enough to the zinc surface to initiate the undesirable hydrogen generation reaction decreases, and further, that as the packing density of surfactant molecules around the surface of the zinc decreases, channels for the water to more easily work near the zinc surface are created, allowing the zinc electrode discharge reaction to proceed more efficiently. Advantageously, a balance between inhibiting the hydrogen generation reaction and allowing efficient discharge reaction can be achieved using the surfactant of the disclosure in the amounts provided herein.

y can be selected from 0 or 1. Thus, in some embodiments, the surfactant comprises a sulfonate (i.e., when y is 0), or a sulfate (i.e., when y is 1). Without intending to be bound by theory, it is believed that by using a sulfonate or sulfate, similar or improved battery activity and properties can be demonstrated relative to batteries including phosphate ester or phosphonate ester surfactants, without causing the environmental drawbacks associated with the use of phosphate ester surfactants.

x can be any whole number integer in the range of 2 to 30, 3 to 25, 3 to 20, 4 to 20, 5 to 15, 6 to 10, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30. In embodiments, the surfactant of formula (I) comprises a mixture of surfactants of formula (I), and the mixture has an average x value in the range of 2 to 30, 3 to 25, 3 to 20, 4 to 20, 5 to 15, 6 to 10, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In embodiments, the surfactant of formula (I) is provided as a mixture having an average x in a range of 6 to 12, for example, 7 to 11, 8 to 10, or 9. Without intending to be bound by theory, it is believed that as the value of x (or average value of x) decreases, the solubility of the surfactant in the electrolyte decreases. Further, without intending to be bound by theory, it is believed that as the value of x (or average value of x) increases, the solubility of the surfactant increases followed by an eventual decrease due to entangling of the chain with other surfactant molecules and/or other materials, and/or the mass of the surfactant becoming too large.

n can be any whole number integer in the range of 2 to 6, for example, 2, 3, 4, 5, or 6. In embodiments, n is in a range of 2 to 5. Without intending to be bound by theory, it is believed that as the value of n increases, the solubility of the surfactant in the electrolyte decreases. In embodiments wherein the surfactant of formula (I) comprises a mixture of surfactants of formula (I), the mixture has an average n value in a range of 2 to 6, for example, 2, 3, 4, 5, or 6.

In general, M can be hydrogen, an alkali metal, or an alkali earth metal. As used herein, "hydrogen" includes protons, "alkali metal" includes alkali metal cations, and "alkali earth metal" includes alkali earth metal cations. Without intending to be bound by theory, it is believed that M can be any cation that can fully dissociate from the surfactant in the electrolyte to allow the oxygen atoms of the surfactant to interact with the surface of the anode active material particles. It will be understood that in embodiments wherein M is an alkali earth metal, the alkali earth metal will act as a bridge between two terminal $SO_3$ moieties of two surfactant molecules, due to the 2+ charge on the metal cation. Suitable cations include protons, alkali metal cations, alkali earth metal cations, and combinations of the foregoing. Examples of alkali metal cations include, but are not limited to, lithium cations, sodium cations, potassium cations, and combinations of the foregoing. Alkali earth metal cations include, but are not limited to, calcium cations, magnesium, cations, and combinations thereof. In embodiments, M is an alkali metal. In embodiments, M comprises sodium, potassium, or a combination thereof.

The surfactant is included in the anode composition to create a protective layer around the zinc particles to inhibit a zinc corrosion reaction, but must be able to dissociate from the surface of the zinc particles to allow for the discharge reaction to proceed. The surfactant can be included in the anode composition in an amount in a range of between about 10 ppm to about 75 ppm, about 10 ppm to about 65 ppm, about 10 ppm to about 55 ppm, about 10 ppm to about 45 ppm, about 10 ppm to about 35 ppm, relative to the amount of zinc in the anode composition, or about 10 ppm to about 50 ppm, for example, about 10 ppm, about 15 ppm, about 20 ppm, about 25 ppm, about 30 ppm, about 35 ppm, about 40 ppm, or about 45 ppm relative to the amount of zinc in the anode composition. The amount of surfactant is provided in terms of parts per million relative to the amount of zinc. Accordingly, for every one million weight parts of zinc there is, for example, 10 to 75 weight parts surfactant. The surfactant can be diluted to a 1% in a 0.05 M alkali hydroxide, e.g., KOH, solution to allow for more accurate amount addition to the anode composition. Without intending to be bound by theory, it is believed that as the level of surfactant increases relative to the amount of zinc in the anode, the surface passivation of the zinc anode increases. Thus, more energy will be required to remove the surfactant molecule from the zinc surface to allow the discharge reaction to proceed. Without intending to be bound by theory, it is believed that the increase in surface passivation can be due to too thick of a surfactant monolayer on the surface of the anode, the formation of a multilayered surfactant micelle on the surface of the anode, or a combination thereof. Advantageously, the surfactant of the disclosure can provide suitable surface coverage of the zinc anode using less surfactant than typical commercial surfactants, thereby requiring less energy to remove the surfactant from the anode surface to allow the discharge reaction to proceed.

In embodiments, the surfactant is free of phosphate ester based surfactants. As used herein, "free of phosphate ester based surfactants" means that the surfactant does not contain a phosphate ester and/or that the anode composition including the surfactant also does not contain significant amounts of phosphate ester based surfactants. Thus, incidental or background quantity of phosphate ester based surfactants (e.g., less than about 100 ppb) may be present in the surfactant and/or anode composition and be within the scope of the disclosure.

In embodiments, the surfactant is free of nonylphenol functional groups. As used herein, "free of nonylphenol functional groups" means that the surfactant does not contain a nonylphenol functional group and/or that the anode composition including the surfactant also does not contain significant amounts of surfactants having a nonylphenol functional group. Thus, incidental or background quantity of surfactants having a nonylphenol functional group (e.g., less than about 100 ppb) may be present in the surfactant and/or anode composition and be within the scope of the disclosure.

Additionally, the rate of surfactant coverage of the zinc particles by the surfactant can play a role in performance decay of a battery comprising same. Without intending to be bound by theory, it is believed that the more quickly the surfactant can reach maximum surface coverage of the zinc anode particles, the less performance capacity decay is demonstrated by a battery comprising said anode because the time that the zinc particles are directly exposed to the electrolyte is minimized. Battery performance capacity can be measured using various known techniques, including but not limited to those described below. Advantageously, surfactants of the disclosure can demonstrate more rapid surface coverage than commercially used phosphate ester surfactants.

Electrolyte

The electrolyte may be dispersed throughout the cathode, the anode and the separator. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, and mixtures thereof. The ionically conductive component may also include a salt. The salt may be, for example, zinc chloride, ammonium chloride, magnesium perchlorate, magnesium bromide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 25 weight percent (wt. %) to about 35 wt. %, on a total weight basis of the electrolyte. For example, the hydroxide concentration of the electrolyte may be from about 25 wt. % to about 33 wt. %, or from about 25 wt. % to about 32 wt. %, on a total weight basis of the electrolyte.

With respect to an assembled alkaline cell, the concentration of the ionically conductive component may be determined by collecting the total amount of electrolyte from within an assembled alkaline cell, for example an AA or an AAA alkaline cell. Removing the separator, cathode, and anode components and dissolving these components within a hydrochloric solution may generally accomplish this.

Hydrogen peroxide may be added in a drop-wise manner to aid in the dissolving process. The dissolved solution may then be diluted to a specific volume to provide an analyte. The analyte may then be analyzed via an inductively coupled plasma (ICP) emission spectrometer, such as a JY Ultratrace or its equivalent, to determine the total positive ion concentration of the ionically conductive component within the analyte, for example potassium ($K^+$) concentration in ppm. The total positive ion concentration determined via ICP from the analyte may be used to mathematically determine the total weight of the positive ion, for example potassium ($K^+$) in grams, and subsequently the total weight of ionically conductive component, for example potassium hydroxide (KOH) in grams, within the electrolyte solution of the sampled alkaline cell. The concentration of the ionically conductive component of the electrolyte, for example potassium hydroxide (KOH), on a weight basis of the electrolyte may be determined by dividing the total weight of the ionically conductive component by the analyte weight.

The aqueous alkaline electrolyte may also include zinc oxide (ZnO). The ZnO may serve to suppress zinc corrosion within the anode. The concentration of ZnO included within the electrolyte may be less than about 3% by weight of the electrolyte. The ZnO concentration, for example, may be less than about 2% by weight of the electrolyte.

The total weight of the aqueous alkaline electrolyte within an AA alkaline battery, for example, may be from about 3.0 grams to about 4.0 grams, for example, from about 3.3 grams to about 3.8 grams, or from about 3.4 grams to about 3.6 grams. The total weight of the aqueous alkaline electrolyte within an AAA alkaline battery, for example, may be from about 1.0 grams to about 2.0 grams, for example, from about 1.2 grams to about 1.8 grams, or from about 1.4 grams to about 1.6 grams.

Cathode

Cathode 12 can includes electrochemically active cathode material, carbon particles, and optionally a binder. The electrolyte solution also is dispersed through cathode 12. The weight percentages provided above and below are determined after the electrolyte solution has been dispersed.

The electrochemically active cathode material can include manganese oxide, manganese dioxide, electrolytic manganese dioxide (EMD), chemical manganese dioxide (CMD), high power electrolytic manganese dioxide (HP EMD), lambda manganese dioxide, and mixtures thereof. Other electrochemically active cathode materials include, but are not limited to, silver oxide, nickel oxide, nickel oxyhydroxide, copper oxide, bismuth oxide, high-valence nickel, alloys thereof, and mixtures thereof. The nickel oxide can include nickel oxyhydroxide, cobalt oxyhydroxide-coated nickel oxyhydroxide, delithiated layered lithium nickel oxide, and combinations thereof. The nickel oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel Oxyhydroxide and gamma-nickel oxyhydroxide. The nickel oxide can include a partially delithiated layered nickel oxide having the general chemical formula $Li_{1-x}H_yNiO_2$, wherein $0.1<x<0.9$ and $0.1<y<0.9$. The high-valence nickel may, for example, include tetravalent nickel.

EMD is typically manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process," a chemical process disclosed by U.S. Pat. No. 2,956,860 (Welsh). Battery-grade $MnO_2$ may be produced via the Sedema process by employing the reaction mixture of $MnSO_4$ and an alkali metal chlorate, for example, $NaClO_3$. Distributors of manganese dioxides include Tronox, Erachem, Tosoh, Delta Manganese, and Xiangtan.

Conventional battery grade manganese dioxide-containing compositions do not have a true stoichiometric formula $MnO_2$, but are better represented by the formula MnOx, wherein x is typically between about 1.92 to 1.96, corresponding to a manganese valence of between about 3.84 and 3.92. Conventional EMD may typically have a value for x of about 1.95 or 1.96, corresponding to a manganese valence of 3.90 and 3.92, respectively. Conventional EMD also has a real density of between about 4.4 and 4.6 g/cm3.

The carbon particles can be any of the conventional carbon particles used in cathodes. The carbon particles can be, for example, graphite particles. The graphite can be synthetic or non-synthetic, or a blend of synthetic and non-synthetic. Suitable graphite particles can be obtained from, for example, Brazilian Nacional de Grafite (Itapecerica, MG Brazil), Imerys Graphite & Carbon (Bodio, Switzerland), Superior Graphite Company (Chicago, Ill.), and Lonza, Ltd (Basel, Switzerland). The cathode may include for example, between about 3% and about 7%, e.g., between about 4% and about 6.5% or about 2% to about 5%, carbon particles by weight.

Carbon particles are included in the cathode to allow the electrons to flow through the cathode. A lower level of carbon particles enables inclusion of a higher level of active material within the cathode without increasing the volume of the cell or reducing the void volume (which must be maintained at or above a certain level to prevent internal pressure from rising too high as gas is generated within the cell).

The binder is stable in the presence of the electrochemically active cathode material. The binder typically has a minimum swelling behavior in water. Minimizing the amount of swelling of the binder maximizes the amount of electrochemically active cathode material in the cathode. In embodiments, the binder has a swelling of no more than about 10%, no more than about 5%, or no more than about 3% in water. Examples of binders include hydroxypropylmethylcellulose (HPMC), polyacrylates, polyvinyl alcohols (PVOH), polyethylene powders, polyacrylamides, Portland cement and fluorocarbon resins, such as PVDF and PTFE. An example of a polyethylene binder is sold under the trade name Coathylene HA-1681 (available from Hoechst). The cathode may include, for example, between about 0.1% and about 1% binder by weight. A lower binder level enables inclusion of a higher level of active material within the cathode.

Cathode 12 can include other additives. Examples of other cathode additives are described in, for example, U.S. Pat. Nos. 5,342,712; 5,698,315; 5,919,598; and 5,997,775 and U.S. application Ser. No. 10/765,569, which are hereby incorporated by reference. Cathode 12 may include, for example, from about 0.2% by weight to about 2% by weight $TiO_2$. The cathode may also include a surfactant. The surfactants will need to be compatible with the binder so as to not adversely affect the binding capability. Examples of suitable surfactants for the cathode include but are not limited to anionic surfactants, amphoteric surfactants, and combinations thereof.

One non-limiting example of suitable surfactants for the cathode can include a diphenyl sulfonate or derivative thereof. In one embodiment, the surfactant comprises an anionic diphenyl sulfonate surfactant or a hydrocarbyl substituted derivative thereof where the hydrocarbyl group contains 1 to about 24, for example, 1 to about 12 carbon atoms. Specific examples include alkali metal alkyl diphenyl oxide disulfonates such as sodium hexyldiphenyloxide disulfonate, sodium decyldiphenyloxide disulfonate, dodecyldiphenyloxide disulfonic acid, sodium dodecyldiphenyloxide disulfonate, N-decyldiphenyloxide disulfonate, sodium n-decyldiphenyloxide disulfonate and sodium n-hexadecyldiphenyloxide disulfonate. Diphenylsulfonate surfactants are commercially available from Dow under the general trade designation "Dowfax," and specifically include Dowfax C6L, C10L, 2AO, 2A1, 2A1-D, 2EP, 3BO, 3B2, 3B2-D, 2000, 8390, and 8390-D.

The amount of electrochemically active cathode material within the cathode may be referred to as the cathode loading. The loading of the cathode may vary depending upon the electrochemically active cathode material used within, and the cell size of, the battery. For example, AA batteries with a manganese dioxide electrochemically active cathode material may have a cathode loading of at least 10.0 grams of manganese dioxide, for example, at least about 10.5 grams of manganese dioxide, between about 10.7 grams and about 11.5 grams of manganese dioxide, between about 10.7 grams and about 11.0 grams of manganese dioxide, between about 10.8 grams and about 11.2 grams of manganese dioxide, between about 10.9 grams and about 11.5 grams of manganese dioxide. For an AAA battery, the cathode loading may be between about 4.0 grams and about 6.0 grams of manganese dioxide. For an AAAA battery, the cathode loading may be between about 2.0 grams and about 3.0 grams of manganese dioxide. For a C battery, the cathode loading may be between about 25.0 grams and about 29.0 grams of manganese dioxide. For a D battery, the cathode loading may be between about 54.0 grams and about 70.0 grams of manganese dioxide.

The cathode will have a sufficient dry density to enable good conductivity. The cathode dry density can be between about 2.0 g/cm$^2$ and 3.5 g/cm$^2$, or between about 2.4 g/cm$^2$ and 3.3 g/cm2.

Separator

The separator 16 can have any of the conventional designs for battery separators. In some embodiments, the separator may comprise woven or nonwoven paper or fabric. The separator may include a layer of, for example, cellophane combined with a layer of non-woven material. The cellophane layer can be adjacent cathode 12 or anode 14. The separator also can include an additional layer of non-woven material. The separator material may be thin. The separator, for example, may have a dry thickness of less than 150 micrometers (microns). The separator, for example, may have a dry thickness of less than 100 microns, for example, from about 70 microns to about 90 microns, or from about 70 microns to about 75 microns. The separator has a basis weight of 40 g/m$^2$ or less, for example, from about 15 g/m$^2$ to about 40 g/m$^2$, or from about 20 g/m$^2$ to about 30 g/m$^2$.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

The battery housing 18 can be any conventional housing commonly used for primary alkaline batteries. The battery housing can be fabricated from metal, for example, nickel-plated cold-rolled steel. The housing generally includes an inner electrically-conductive metal wall and an outer electrically non-conductive material such as heat shrinkable plastic. An additional layer of conductive material can be disposed between the inner wall of the battery housing 18 and cathode 12. This layer may be disposed along the inner surface of the wall, along the circumference of cathode 12, or both. This conductive layer can be applied to the inner wall of the battery, for example, as a paint or dispersion including a carbonaceous material, a polymeric binder, and one or more solvents. The carbonaceous material can be carbon particles, for example, carbon black, partially graphitized carbon black, or graphite particles. Such materials include LB1000 (Timcal, Ltd.), Eccocoat 257 (W.R. Grace & Co.), Electrodag 109 (Acheson Colloids, Co.), Electrodag 112 (Acheson), and EB0005 (Acheson).

The anode current collector 20 passes through seal 22 extending into anode 14. Current collector 20 is made from a suitable metal, such as brass or brass-plated steel. The upper end of the current collector 20 electrically contacts the negative top cap 24. Seal 22 can be made, for example, of nylon.

Battery 10 can be assembled using convention methods and hermetically sealed by a mechanical crimping process.

The compositions and methods in accordance with the disclosure can be better understood in light of the following examples, which are merely intended to illustrate the compositions and methods of the disclosure and are not meant to limit the scope thereof in any way.

In-Cell Gas (ICG) Test Method

In cell gas testing was performed on cells either undischarged or discharged such that 25% to 30% of the capacity was delivered. Cells were then either tested without heating or heated at 71° C.±1° C. for 1 week, 2 weeks, or 4 weeks. After the cells were allowed to return to room temperature, they were tested according to methods known in the art. For example, the cells were placed into and enclosed in a sealed chamber with a manometer or other equivalent pressure measurement device attached. The cell was punctured with a pin that is part of the sealed chamber, allowing the trapped gasses to escape. The cell pressure was then measured using the manometer or other equivalent pressure measurement device.

Performance Test Methods

Performance testing includes discharge performance testing that may be referred to as the ANSI/IEC Motor/Toys Test (Toy Test). The Toy Test protocol includes applying a constant load of 3.9 Ohms for 1 hour. The battery then rests for a period of 23 hours. This cycle is repeated until the cutoff voltage of 0.8 volts is reached.

Performance testing also includes discharge performance testing that may be referred to as the Digital Camera (DCam) Test. The DCam protocol includes 1500 mW for 2 sec., 650 mW for 28 sec., repeated for 5 min/hr, to a 1.05 V or 0.9 V cutoffs (measuring pulses, simulating number of pictures).

Performance testing protocols are summarized in the following table:

| Test | Protocol | Voltage Cutoff for Discharge | Voltage Cutoff for Data | Report Units |
|---|---|---|---|---|
| ANSI/IEC - Remote/Radio/Clock (2015) | 50 mA, 1 h/8 h-24 h/d | 0.8 V | 1.0 V | Service Hrs |
| ANSI/IEC - Digital Audio (2015) | 100 mA, 1 h/d | 0.8 V | 0.9 V | Service Hrs |
| ANSI/IEC - Toy, Non-Motorized (2015) | 250 mA, 1 h/d | 0.9 V | 0.9 V | Service Hrs |
| ANSI/IEC - Portable Lighting (2015) | 3.9 Ohm, 4 m/h-8 h/d | 0.8 V | 0.9 V | Service Hrs |
| ANSI/IEC - Motor/Toy (2015) (Toy Test) | 3.9 Ohm, 1 h/d | 0.7 V | 0.8 V | Service Hrs |
| ANSI - Personal Grooming (2015) | 750 mA, 2 m/h-8 h/d | 0.9 V | 1.1 V | Service Hrs |
| ANSI/IEC-Digital Still Camera (2015) (DCam) | 1500 mW(2 s)/650 mW(28 s) 5 m/h 24 h/d | 0.9 V | 1.05 V | Pulses |

Pulse Impedance Test Method

AA sized cells were discharged with an 18.5 ohm load for 100 milliseconds. The voltage of the cell is monitored for 200 milliseconds. Both the initial open circuit voltage and the lowest voltage recorded during the test were recorded. The difference between the initial open circuit voltage and the lowest voltage is the level of pulse impedance voltage drop.

AC Impedance Test Method

Cells were connected to interconnected Solartron Frequency Response Analyzer (or equivalent) and Solartron Electrochemical Interface (or equivalent) instruments. ZPlot software was used to control the testing and record the resultant data. A frequency sweep from 65000 Hz to 0.1 Hz is performed at a DC potential of 0 vs. open circuit and an AC amplitude of 10 mV. The ohmic resistance of the cell was measured from the curve intercept at the Z" axis of the plotted data. The passive resistance of the cell is measured from the diameter of a circle fitted from the passivation curve section of the plotted data.

Analysis of Surfactant in Assembled Battery 5.5 to 6.0 grams of anode slurry was first treated with 1 mL of glacial acetic acid, mixed vigorously for 6 minutes, and vacuum filtered on a 20 μM Nylon filter along with an additional 4 mL of acetone for washing the solids, and then the resultant filtrate was centrifuged to force the remaining solids. 1 mL of the solution was evaporated with a gas flow and was redissolved in a 60% methanol/40% deionized water solution. 20 μL of this solution was injected into an HPLC with an ELSD detector (or equivalent) and a mobile phase of 80% deionized water/20% acetonitrile for the first 10 minutes, 40% deionized water/60% acetonitrile for the next 5 minutes, and 80% deionized water/20% acetonitrile for the final 5 minutes with a constant flow rate of 1 mL/min. The area under the band that elutes at approximately 11.8 min. was used to measure the concentration of surfactant in the anode. A calibration curve was made in advance using known surfactant concentration solutions following the same HPLC procedure to allow for concentration measurement.

EXAMPLES

Example 1

Size AA batteries having identical components except the composition of the anode were prepared using the anode compositions described in Table 1. Batteries were assembled with separators comprising a mixture of non-woven cellulose and polyvinyl alcohol, and electrolytes comprising 31 wt. % potassium hydroxide and 2% zinc oxide. The batteries were stored at room temperature, e.g., at about 21° C. and then tested for In-cell Gassing, Performance, Pulse Impedance, and AC Impedance, as described above. The results are shown in Table 1, below.

TABLE 1

|  | Control Battery A Anode Composition | Battery B Anode Composition | Battery C Anode Composition |
|---|---|---|---|
| Zinc type (amount in grams) | Zinc particles (4.72 g) | Zinc particles (4.72 g) | Zinc particles (4.72 g) |
| Gelling agent (wt. % relative to anode) | Polyacrylic acid polymer (1.45 wt %) | Polyacrylic acid polymer (1.45 wt %) | Polyacrylic acid polymer (1.45 wt %) |
| Surfactant (ppm relative to Zn) | Polyoxyethylene dinonylphenyl ether phosphate (100 ppm) | $C_{12}$-$C_{14}$-tert-alkyl-ethoxylated sodium sulfate (30 ppm) | $C_{12}$-$C_{14}$-tert-alkyl-ethoxylated sodium sulfate (50 ppm) |
| ICG UD 1W71C (mL) | 0.93 | 0.94 | 0.55 |
| ICG PD 0W (mL) | 1.19 | 1.31 | 0.97 |
| ICG PD 1W71C (mL) | 2.12 | 2.11 | 1.81 |
| Digital Camera to 1.05 V (pulses) | 128.5 | 131.3 | 105.7 |
| Digital Camera to 0.9 V (pulses) | 178.8 | 181.8 | 152.2 |

TABLE 1-continued

|  | Control Battery A Anode Composition | Battery B Anode Composition | Battery C Anode Composition |
|---|---|---|---|
| Motor/Toy to 0.8 V (SH) | 8.487 | 8.696 | 8.814 |
| 1 Week Pulse Imp Drop (V) | 0.027 | 0.038 | 0.174 |
| 2 Month Pulse Imp Drop (V) | 0.92 | 0.64 | 0.174 |
| AC Passivation (1 week) | 0.3578 | 0.4110 | 5.9813 |
| AC Passivation (2 month at room temp) | 0.8633 | 0.4803 | 15.6165 |

Example 1 shows that compared to control battery A, battery C demonstrated low ICG, low Digital Camera, improved Motor/Toy and very high one week pulse impedance suggesting that the amount of zinc surface coverage provided by the surfactant of the disclosure is much larger than the surface coverage provided by commercial, control surfactants, despite similar or lower concentrations. Without intending to be bound by theory, it is believed that the increase in zinc surface coverage leads to less spontaneous hydrogen gas formation, more internal mass transfer or electron flow resistance in the Digital Camera discharge test, and a more favorable zinc oxide precipitation mechanism in the Motor/Toy Test. Example 1 further shows that compared to control battery A, battery B of the disclosure demonstrate nearly equivalent Digital Camera performance, similar ICG values and one week pulse impedance and moderate Toy improvement, suggesting that the surfactant of the disclosure provides zinc surface coverage similar to that of the commercial, control, surfactant at surprisingly low levels, for example, levels as low as 30 wt. %, relative to the weight of the surfactant used commercially. Accordingly, because the surfactant of the disclosure can advantageously coat the surface of the anode using substantially less surfactant than needed with the commercial surfactants, there is less surfactant on the surface of the anode that must be removed to allow the discharge reaction to proceed. Without intending to be bound by theory, it is believed that the surfactants of the disclosure have greater solubility in an alkaline electrolyte than the commercial surfactants. As a result, advantageously less energy is required to remove the surfactant of the disclosure from the anode surface. Pulse and AC impedance testing of 1 week old batteries of the disclosure (e.g., battery B) showed slightly higher values for voltage drop and passivation curve diameter than control battery A. However, after 2 months storage, the batteries of the disclosure demonstrated much lower values for voltage drop and passivation curve diameter than the control battery A, suggesting that there is less high rate discharge test capacity fade over time for the batteries of the disclosure.

Similar batteries were prepared using 80 ppm and 100 ppm of the surfactant of the disclosure, relative to the amount of zinc. The batteries comprising 80 ppm and 100 ppm of the surfactant of the disclosure did not perform as well as Example batteries B and C, comprising only 30 ppm and 50 ppm of the surfactant of the disclosure relative to the amount of zinc, respectively, and thereby confirm that including about 10 ppm to about 45 ppm surfactant of the disclosure provides a significant performance improvement over batteries including greater than 50 ppm surfactant of the disclosure.

Thus, Example 1 shows that batteries of the disclosure including anodes comprising the surfactant of the disclosure perform at least as well as commercial, control batteries, while including significantly less surfactant than the commercial, control batteries.

Example 2

Batteries having identical components except the composition of the anode were prepared using the anode compositions described in Table 2. Batteries were assembled with separators comprising a combination of rayon/polyvinyl alcohol and cellophane, and electrolytes comprising 31 wt. % potassium hydroxide and 2% zinc oxide. The batteries were tested for Performance, Pulse Impedance, and Passive Resistance, as described above. The results are shown in Table 2, below.

TABLE 2

|  | Control Battery D Anode Composition | Battery E Anode Composition | Battery F Anode Composition | Battery G Anode Composition |
|---|---|---|---|---|
| Zinc type (amount in grams) | Zinc particles (4.3 g) | Zinc particles (4.3 g) | Zinc particles (4.3 g) | Zinc particles (4.3 g) |
| Gelling agent (wt. % relative to anode) | Polyacrylic acid polymer (1.45 wt %) | Polyacrylic acid polymer (1.45 wt %) | Polyacrylic acid polymer (1.45 wt %) | Polyacrylic acid polymer (1.45 wt %) |
| Surfactant (ppm relative to Zn) | Polyoxyethylene dinonylphenyl ether phosphate (100 ppm) | $C_{12}$-$C_{14}$-tert-alkyl-ethoxylated sodium sulfate (40 ppm) | $C_{12}$-$C_{14}$-tert-alkyl-ethoxylated sodium sulfate (30 ppm) | $C_{12}$-$C_{14}$-tert-alkyl-ethoxylated sodium sulfate (20 ppm) |
| 6 Day RT Pulse Imp Voltage Drop (V) | 0.031 | 0.099 | 0.060 | 0.022 |
| 1 month RT Pulse Imp Voltage Drop (V) | 0.083 | 0.155 | 0.099 | 0.029 |

TABLE 2-continued

|  | Control Battery D Anode Composition | Battery E Anode Composition | Battery F Anode Composition | Battery G Anode Composition |
|---|---|---|---|---|
| 2.5 month RT Pulse Imp Voltage Drop (V) | 0.083 | 0.148 | 0.082 | 0.020 |
| 3 month RT Pulse Imp Voltage Drop (V) | 0.102 | 0.157 | 0.099 | 0.028 |
| 6 day RT OCV (V) | 1.633 | 1.633 | 1.632 | 1.632 |
| 6 day RT Ohmic ($\Omega$) | 0.062 | 0.061 | 0.062 | 0.061 |
| 6 day RT Passive ($\Omega$) | 0.379 | 2.785 | 0.885 | 0.276 |
| 1 month RT Passive ($\Omega$) | 1.496 | 12.285 | 2.559 | 0.370 |
| 2.5 month RT Passive ($\Omega$) | 2.974 | 25.617 | 3.050 | 0.368 |
| 3 month RT Passive ($\Omega$) | 3.302 | 27.678 | 3.341 | 0.376 |
| Digital Camera to 1.05 V (pulses) | 118.7 | 95.8 | 115.0 | 128.3 |
| 3 month RT Digital Camera to 1.05 V (pulses) | 109.3 | 96.1 | 113.8 | 127.1 |
| 3 month RT vs. 2 week TTC Digital Camera (pulses) | −9.4 | 0.3 | −1.2 | −1.2 |
| Groomer to 1.1 V (SH)) | 1.196 | 1.060 | 1.210 | 1.234 |
| 3 month RT Groomer to 1.1 V (SH) | 1.205 | 1.097 | 1.228 | 1.239 |
| 3 month RT vs. 2 week TTC Groomer (SH) | 0.009 | 0.037 | 0.018 | 0.005 |
| Motor/Toy to 0.8 V (SH) | 8.508 | 8.615 | 8.554 | 8.422 |
| 3 month RT Motor/Toy to 0.8 V (SH) | 8.531 | 8.535 | 8.635 | 8.515 |
| 3 month RT vs. 2 week TTC Motor/Toy (SH) | 0.023 | −0.080 | 0.081 | 0.093 |
| CD to 0.9 V (SH) | 8.994 | 8.860 | 9.023 | 8.955 |
| LIF to 0.9 V (SH) | 6.355 | 6.287 | 6.280 | 6.261 |

Pulse impedance testing of 6 day old batteries of the disclosure (batteries F and G) showed lower or only slightly higher initial values for voltage drop than control battery D. However, after 2 months storage, the batteries of the disclosure demonstrated at least as low as, or lower, values for voltage drop than the control battery D, and after 3 months storage, the batteries of the disclosure demonstrated lower values for voltage drop than the control battery D. This data suggests that there is less high rate discharge test capacity fade over time for the batteries of the disclosure, relative to control batteries including commercial surfactants. The average passive resistance of batteries of the disclosure (F and G) after 6 days was comparable to, or slightly larger than, control battery D, and the values for the batteries of the disclosure became better than, or at least as good as, the control battery D after 2.5 months of room temperature storage. Battery G of the disclosure demonstrated a passivation curve increase plateau much more quickly (1 month or less) than the control battery D (3 months or more). Further, the batteries of the disclosure (F and G) demonstrated less Digital Camera performance fade after 3 months of storage at room temperature relative to the commercial, control battery (D), as well as comparable results for the Groomer test and the mid- and low-rate tests. These results suggest that at levels of only 20 or 30 wt % of the level of surfactant commercially used, surfactants of the disclosure provide similar initial zinc surface coverage as commercial surfactants and advantageously demonstrate minimal increased zinc surface coverage over extended room temperature storage, indicating that the surfactants of the disclosure reach maximum passivation faster and do not form additional surfactant layers and/or micelles at the anode surface upon prolonged storage.

As can be seen from the data shown in Table 2, batteries including the surfactant of the disclosure in amounts of about 40 wt %, relative to the level of surfactant commercially used, also perform as well as conventional batteries. In particular, the stability of the Digital Camera pulse value over three months for battery E was greater (change in pulse value of 0.3), than that of the control battery D, which showed a decrease in the number of pulses over time (a decrease of 9.4). It is postulated that at least 10 ppm of surfactant of the disclosure relative to zinc (i.e., 10 wt % relative to the amount of surfactant used commercially) is needed to sufficiently coat the anode surface to prevent the generation of hydrogen gas.

Thus, Example 2 shows that batteries of the disclosure including anodes comprising the surfactant of the disclosure perform at least as well as, if not better than, commercial, control batteries, while including significantly less surfactant than the commercial, control batteries.

The foregoing description is given for clearness of understanding only, and no unnecessary limitations should be understood therefrom, as modifications within the scope of the disclosure may be apparent to those having ordinary skill in the art.

All patents, publications, and references cited herein are hereby fully incorporated by reference. In case of a conflict between the present disclosure and incorporated patents, publications, and references, the present disclosure should control.

What is claimed:

1. An anode composition comprising:
   zinc or a zinc alloy; and
   a surfactant of formula (I):

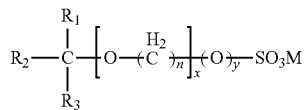

wherein $R_1$, $R_2$, and $R_3$ are each individually selected from hydrogen, $C_1$-$C_{12}$ alkyl, and aryl;
   y is null or 1;
   x is an integer from 2 to 30;
   n is an integer from 2 to 6; and
   M is hydrogen or an alkali metal;
   provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl or aryl, at least one of $R_1$, $R_2$, and $R_3$ comprises a $C_2$-$C_{12}$ alkyl or aryl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

2. The anode composition of claim 1, wherein at least two of $R_1$, $R_2$, and $R_3$ are $C_1$-$C_{12}$ alkyl or aryl.

3. The anode composition of claim 1, wherein n is an integer from 2 to 3.

4. The anode composition of claim 1, wherein n is 2.

5. The anode composition of claim 1, wherein n is 3.

6. The anode composition of claim 1, wherein M is an alkali metal.

7. The anode composition of claim 6, wherein M comprises sodium, potassium, or a combination thereof.

8. The anode composition of claim 1, wherein the surfactant of formula (I) is provided as a mixture of surfactants of formula (I), wherein for each surfactant x is an integer from 2 to 30.

9. The anode composition of claim 8, wherein for the mixture of surfactants of formula (I), the average x is an integer from 6 to 12.

10. The anode composition of claim 1, wherein y is null.

11. The anode composition of claim 1, wherein y is 1.

12. The anode composition of claim 1, wherein at least one of $R_1$, $R_2$, and $R_3$ comprises at least a $C_5$ alkyl.

13. The anode composition of claim 1, wherein at least one of $R_1$, $R_2$, and $R_3$ comprises a $C_5$ alkyl.

14. The anode composition of claim 1, wherein the at least one of $R_1$, $R_2$, and $R_3$ comprises an aryl.

15. The anode composition of claim 1, wherein at least one of $R_1$, $R_2$, and $R_3$ comprises a $C_5$ alkyl, at least one of $R_1$, $R_2$, and $R_3$ comprises a $C_4$ alkyl, and at least one of $R_1$, $R_2$, and $R_3$ comprises a $C_3$ alkyl.

16. The anode composition of claim 1, wherein at least one of $R_1$, $R_2$, and $R_3$ comprises a $C_9$-$C_{12}$ alkyl, and at least two of $R_1$, $R_2$, and $R_3$ comprise methyl or ethyl.

17. The anode composition of claim 1, wherein the surfactant is provided in an amount in a range of about 15 ppm to about 45 ppm, relative to the amount of zinc.

18. An alkali battery comprising:
   an anode composition according to claim 1.

19. The alkali battery of claim 18, wherein the in the anode composition comprises the surfactant in an amount in a range of between about 10 ppm to about 45 ppm, relative to the amount of zinc in the anode composition.

20. A method of making a battery anode, comprising admixing a zinc or zinc alloy with a surfactant of formula (I):

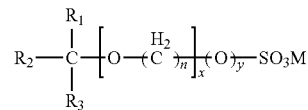

wherein $R_1$, $R_2$, and $R_3$ are each individually selected from hydrogen, $C_1$-$C_{12}$ alkyl, and aryl;
   y is null or 1;
   x is an integer from 2 to 30;
   n is an integer from 2 to 6; and
   M is hydrogen or an alkali metal;
   provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl or aryl, at least one of $R_1$, $R_2$, and $R_3$ comprises a $C_2$-$C_{12}$ alkyl or aryl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

21. A method of making a battery, comprising:
   incorporating into a battery an anode including a zinc or a zinc alloy and a surfactant of formula (I):

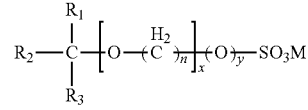

wherein $R_1$, $R_2$, and $R_3$ are each individually selected from hydrogen, $C_1$-$C_{12}$ alkyl, and aryl;
   y is null or 1;
   x is an integer from 2 to 30;
   n is an integer from 2 to 6; and
   M is hydrogen or an alkali metal;
   provided that: when two of $R_1$, $R_2$, and $R_3$ are hydrogen, at least one of $R_1$, $R_2$, and $R_3$ is a $C_4$-$C_{12}$ alkyl or aryl; or, when each of $R_1$, $R_2$, and $R_3$ are alkyl or aryl, at least one of $R_1$, $R_2$, and $R_3$ comprises a $C_2$-$C_{12}$ alkyl or aryl; or when $R_1$ is hydrogen, then (a) each of $R_2$ and $R_3$ comprises a $C_2$-$C_{12}$ alkyl or aryl or (b) at least one of $R_2$ and $R_3$ comprises a $C_3$-$C_{12}$ alkyl or aryl.

22. The method of claim 21, wherein the surfactant is provided in an amount in a range of between about 15 ppm to about 45 ppm, relative to the amount of zinc in the anode composition.

* * * * *